June 11, 1968   R. E. RICE   3,387,667
AGRICULTURAL BED-SHAPING IMPLEMENT
Filed Dec. 20, 1965   2 Sheets-Sheet 2
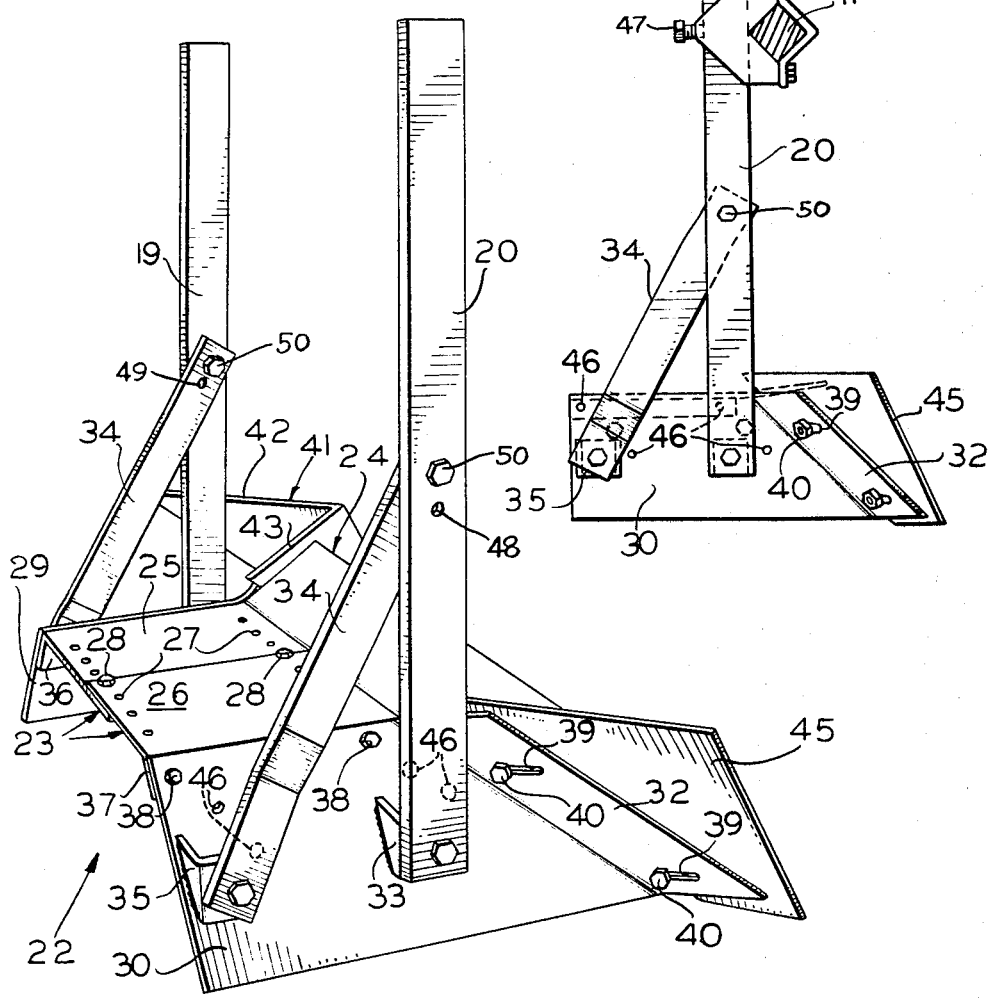
INVENTOR
RUSSELL E. RICE
ATT'Y United States Patent Office 3,387,667
Patented June 11, 1968

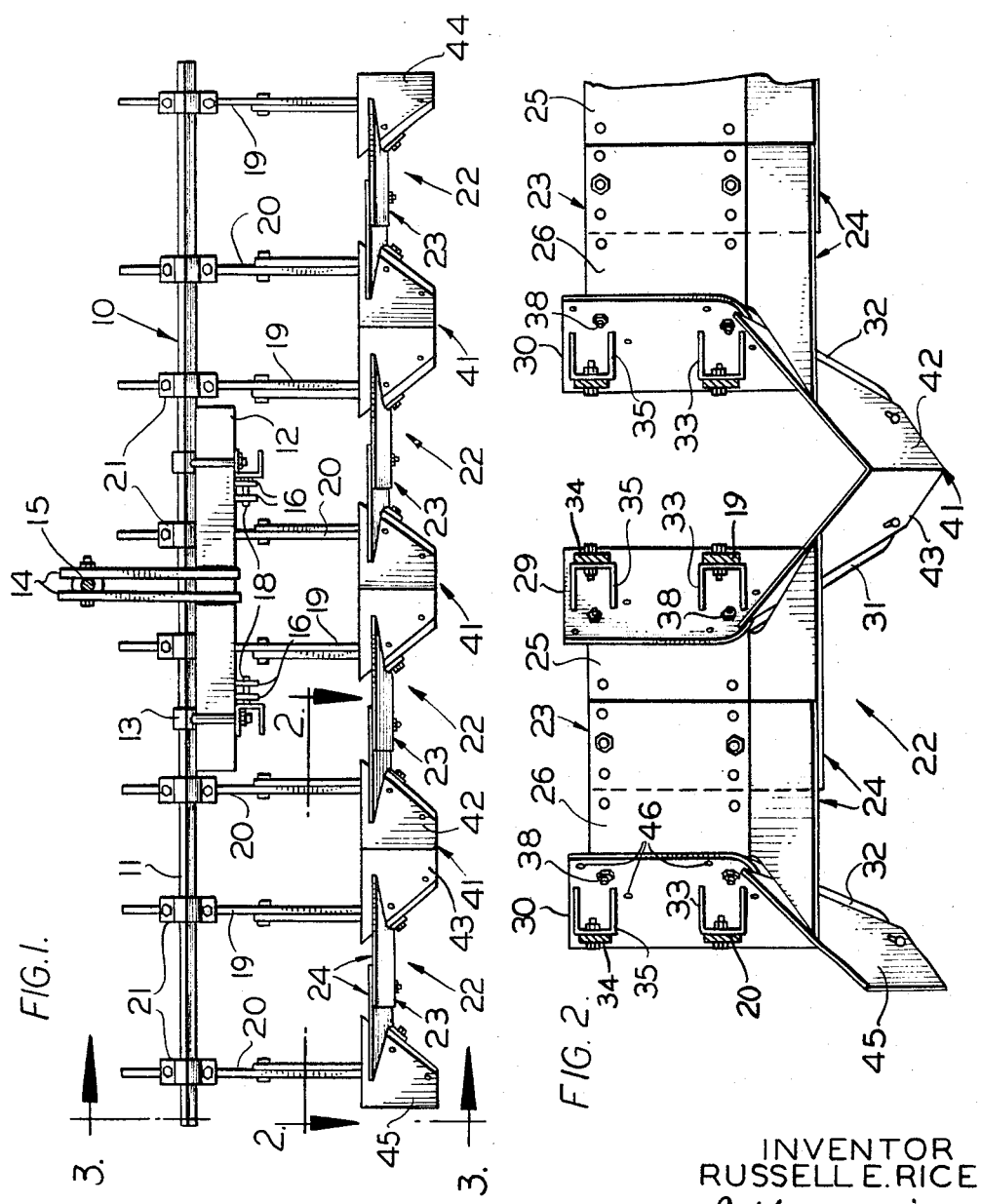

3,387,667
AGRICULTURAL BED-SHAPING IMPLEMENT
Russell E. Rice, Stockton, Calif., assignor to International Harvester Company, Chicago, Ill., a corporation of New Jersey
Filed Dec. 20, 1965, Ser. No. 515,065
2 Claims. (Cl. 172—701)

ABSTRACT OF THE DISCLOSURE

An agricultural implement to form raised beds having a flat top and outwardly and downwardly sloping sides terminating in furrows between adjacent beds, wherein the top of the implement or shaper comprises relative adjustable plate members for regulating the width of bed, and the sides are vertically adjustable relative to the top to regulate the height of the bed, the sides being shaped with the forward edge inclined forwardly, downwardly and outwardly.

---

This invention relates to agricultural implements and particularly to machinery for working the soil preparatory to growing a crop. More specifically, the invention concerns apparatus for seed bed forming and shaping.

An object of the invention is the provision of improved bed shaping apparatus adapted to prepare a seed bed having a relatively wide, flat top and sloping sides and separated from adjacent beds by relatively deep furrows.

Another object of the invention is the provision of improved bed shaping apparatus wherein means are provided for quickly and easily adjusting the width of the shaped bed.

Another object of the invention is the provision of an improved seed bed shaper of tunnel shape having a flared opening defined by a horizontal transverse forward edge flared upwardly and side edges extending forward of said forward edge and inclined downwardly and outwardly to guide dirt into said opening.

Other objects and advantages of the invention will become clear from the following detailed description when read in conjunction with the accompanying drawings wherein:

FIGURE 1 is a view in front elevation showing a bed shaper incorporating the features of this invention adapted to be mounted upon a tractor to be propelled and transported thereby.

FIGURE 2 is an enlarged section taken on the line 2—2 of FIGURE 1.

FIGURE 3 is an enlarged section taken on the line 3—3 of FIGURE 2.

FIGURE 4 is an enlarged perspective view of one of the shapers shown in FIGURE 1, and FIGURE 5 shows a profile of a portion of a seed bed formed by the implement of this invention.

In the drawings, the numeral 10 designates a traveling support or frame comprising at least one transversely extending tool bar 11. A crossbar 12 is secured to tool bar 11 by clamps 13 and has affixed to its central portion a vertically extending mast 14 for connection to the upper link 15 of the conventional three-point hitch of a tractor, not shown, and depending pairs of lugs 16 carrying pins 18 for connection to the lower links, not shown, of said three-point hitch, whereby the implement may be mounted upon a tractor to be transported thereby.

Laterally spaced pairs of hangers 19 and 20 are secured to the tool bar 11 by clamps 21, laterally adjustable on the tool bar. As will be observed from the drawings, the pairs of hangers 19 and 20 are laterally spaced the distance between adjacent seed beds, and it may be understood that the machine of this invention is adapted to shape beds previously roughly formed, for example, by disks and the like. Each pair of hangers 19 and 20 carries at its lower end a shaper designated by the numeral 22, each of which is a substantial duplicate of the other so that a description of one will suffice for all.

Each shaper 22 comprises a generally horizontal flat plate-like member 23, the forward end of which is flared upwardly and outwardly to form an inclined flange 24, member 23 comprising lapping sections 25 and 26 having a plurality of spaced forwardly and rearwardly disposed openings 27 in plate 25 being adapted to register with corresponding openings in plate section 26 to receive bolts 28, by which the width of the plate member 23 may be adjusted to vary the width of the seed bed.

As will be observed from FIGURE 5, the profile or vertical section taken through a bed is in the form of an isoceles trapezoid, the top being flat and the sides sloping outwardly and downwardly. The sides of the bed are shaped by downwardly and outwardly directed allochiral left- and right-hand members 29 and 30, forming with plate member 23 a tunnel in which the dirt is received and shaped as the machine is propelled over the ground.

The rear edges of the side members 29 and 30 are at substantially right angles with respect to the upper and lower edges thereof, while the forward edge of each side member is inclined forwardly downwardly and outwardly and is trapezoidally shaped in the flat plane thereof. The forward downwardly and outwardly inclined edges of the members 29 and 30 are bent laterally into flanges 31 and 32, forming with flange 24 a flared entrance to the shaper to prevent dirt spilling over.

The lower ends of hangers 19 and 20 are secured to U-shaped brackets 33 affixed to the side members 29 and 30, braces 34 being connected to brackets 35 also affixed to the side members 29 and 30, and to the hangers 19 and 20.

The outer edges of plate sections 25 and 26 are bent downwardly and outwardly to form flanges 36 and 37 having openings therein registering with openings in the side members 29 and 30 to receive bolts 38, by which the side members are movably secured to the sections 25 and 26.

Flanges 31 and 32 are provided with slotted openings 39 to receive bolts 40 by which adjacent side members 29 and 30 may serve for mounting between adjacent shapers, a V-shaped furrowing member 41 having wings 42 and 43 adjustably secured by the bolts 40 to adjacent flanges 31 and 32, respectively. Members 41 serve to scrape the bottom of the furrow between adjacent beds, and outermost flanges 31 and 32 of the outermost units 22 have secured thereto left- and right-hand wings 44 and 45, each of which comprises one half of a furrowing member 41.

The hangers 19 and 20 are individually adjustable by adjusting clamps 21 on tool bar 13 to vary the spacing between units 22 and therefore the spacing between adjacent beds, a corresponding adjustment being made in furrowing member 41 by adjusting bolts 40 in slots 39. The width of the bed, as pointed out before, is varied by adjusting the plate section 25 with respect to section 26, compensation for this adjustment being made by adjusting hangers 19 and 20 relative to each other.

It may be understood that the supporting frame 10 may include additional bars similar to 11, and may carry other devices such as planters, fertilizers, insecticide incorporators and the like for treating the prepared bed.

In addition to the adjustment for the width of the furrow, adjustment is also provided for its height, a plurality of angularly arranged openings 46 generally parallel to the front edges of sides plates 29 and 30 being provided in said plates to optionally receive the bolts 38.

Such height adjustment requires corresponding vertical adjustment of the standards or hangers 19 and 20. For this purpose, each of the clamping members 21 is provided with an opening in which the hangers 19 and 20 are slidably received, the hangers being held in adjusted position by the provision of set-screws 47 carried by the clamps.

It may also be noted that the operating angle assumed by the lower edges of side members 29 and 30 with respect to the ground may be varied and this is accomplished by the provision of a plurality of openings 48 in hangers 19 and 20 and a plurality of openings 49 registerable with selected openings 48 to receive bolts 50.

From the foregoing it should be clear that applicant has provided a bed shaper of improved construction and operation which makes maximum use of the soil available for forming the seed bed. In conventional shapers, all of the dirt does not flow into the forward opening of the shaper as the implement progresses over the ground but spills over the sides of the shaper into the furrow. In applicant's construction, the lower edges of the side plates project substantially forwardly of the shaper opening and this forward projection combined with the lateral bend in the projecting edge causes all of the dirt to flow into the shaper opening.

The construction and operation of the novel seed bed shaper of this invention will be clearly understood from the foregoing description. It should likewise be understood that the invention has been described in its preferred embodiment and that modifications may be made therein without departing from the spirit of the invention or the scope of the appended claims.

What is claimed is:

1. In an agricultural implement adapted to form laterally spaced crop beds separated by furrows, a traveling support, a plurality of laterally spaced shapers each comprising a relatively wide generally horizontal portion having forward and rear edges and downwardly and outwardly directed side members also having forward and rear edges and engageable with and forming the top and sides of a bed, hanger means secured to each of said shapers and to the traveling support, each of said shapers including at least two parts secured together and relatively laterally adjustable to vary the width of the shaper and therefore of the bed formed thereby, each of said side members being generally trapezoidal with the forward edge thereof being directed forwardly outwardly and downwardly relative to the forward edge of said horizontal portion, said forward edge of each of said side members being flared outwardly to form a laterally directed flange, and the adjacent of said shapers being connected by a forwardly directed V-shaped furrowing device having wings removably secured to the said laterally directed flanges of adjacent side members.

2. The invention set forh in claim 1, wherein said side members are separable from and adjustably secured to said generally horizontal portion by means accommodating vertical adjustment of each of said side members relative to said generally horizontal portion in paths generally parallel to said forward edges of said side members.

References Cited

UNITED STATES PATENTS

| | | | |
|---|---|---|---|
| Re. 25,439 | 9/1963 | Mostrong | 172—252 |
| 3,128,833 | 4/1964 | Johnson et al. | 172—701 X |
| 3,252,522 | 5/1966 | Taylor | 172—414 |

ABRAHAM G. STONE, *Primary Examiner.*

R. C. HARRINGTON, *Assistant Examiner.*